United States Patent [19]

Miyako et al.

[11] Patent Number: 4,538,258
[45] Date of Patent: Aug. 27, 1985

[54] RECORD

[75] Inventors: Haruyoshi Miyako; Kiyoteru Arima, both of Nagano, Japan

[73] Assignee: Kabushiki Kaisha Sankyo Seiki Seisakusho, Nagano, Japan

[21] Appl. No.: 526,842

[22] Filed: Aug. 26, 1983

[30] Foreign Application Priority Data

Aug. 31, 1982 [JP] Japan .................. 57-132181

[51] Int. Cl.³ .................. G11B 23/00; G11B 25/04
[52] U.S. Cl. .................. 369/271; 369/280; 369/282
[58] Field of Search ........... 369/270, 271, 280, 65, 369/66, 67, 281, 282, 63

[56] References Cited

U.S. PATENT DOCUMENTS 2,503,609 4/1950 Barnhart .................. 369/280
2,809,843 10/1957 Mueller .................. 369/281

FOREIGN PATENT DOCUMENTS 685050 12/1939 Fed. Rep. of Germany ...... 369/282
8122 8/1909 United Kingdom .............. 369/280

Primary Examiner—Steven L. Stephan
Attorney, Agent, or Firm—Sughrue, Mion, Zinn, Macpeak & Seas

[57] ABSTRACT

A record (12) comprising a convex protrusion (12a) at its center, one or more protrusions (12b) extending perpendicularly from the plane of the record at its circumferential edge, and a recording area between the center and the circumferential edge. The protrusions engage similar indentations (3b, 3e) formed in a turntable to facilitate centering and holding the record for playing and to prevent rotational slippage.

3 Claims, 7 Drawing Figures

RECORD

BACKGROUND OF THE INVENTION

The present invention relates to a record applied to a sound reproducing apparatus for an audio signal such as voice, which initiates its reproducing operation only in response to the insertion of the record.

Such a sound reproducing apparatus is known, in which a record is pressed against the central portion of a turntable after the record has been inserted and a tone arm is moved to its reproducing position to perform the reproducing operation. Upon the actuation of a release lever the tone arm and the record are lifted so that the record can be taken out of the apparatus.

Conventionally, a flat disc-like record having a center hole has been used as a record applicable to such a reproducing apparatus. However, in order to freely use this reproducing apparatus without any trouble in any orientation of the apparatus, whether horizontal or vertical, it is necessary to provide a mechanism in the reproducing apparatus for preventing rotational slip of the record. Such rotational slip prevention mechanisms are complicated. In a reproducing apparatus of the type in which a record is mounted on a turntable, there is a further problem that slip may easily occur between the record and the turntable because very thin and very light records are often used. Further, it is necessary to insert the center hole of a record onto the center shaft of a turntable with a moderately tight fit in order to determine the center position of the record with respect to the turntable. There then arises a problem in the conventional reproducing apparatus that the mechanism for center hole insertion of a record onto the turntable is complicated.

SUMMARY OF THE INVENTION

An object of the present invention is therefore to provide a record which can remarkably simplify the mechanism for rotational slip of a record in a reproducing apparatus as well as simplify the mechanism for center positioning of the record on a turntable.

The invention is a record having a central convex protrusion and additional protrusions on the circumferential edge to engage corresponding indentations in a turntable, thereby simplifying the sound playing apparatus needed for centering and rotating the record.

DETAILED DESCRIPTION OF THE PREFERRED EMBODIMENT

Figure 1:
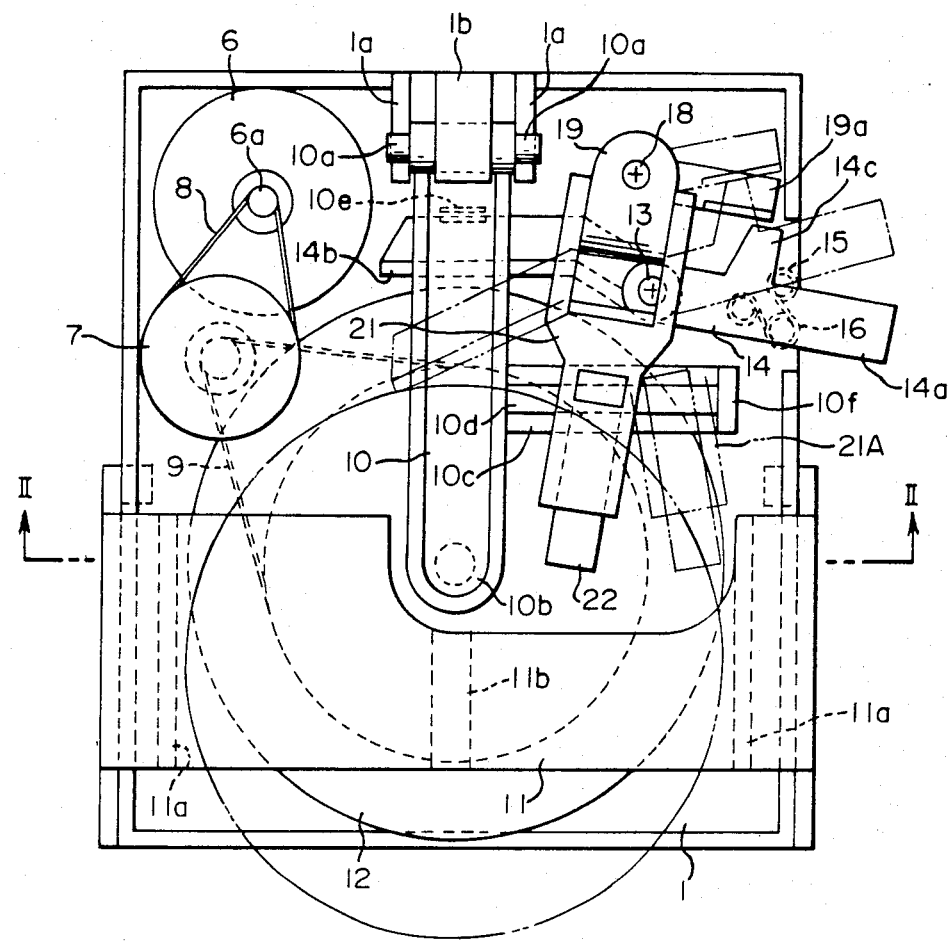
FIG. 1 is a plan view illustrating an example of a reproducing apparatus in which the record according to the present invention is used.

Referring to the drawings, an embodiment of the record according to the present invention will be described together with an example of the reproducing apparatus.

Figure 2:
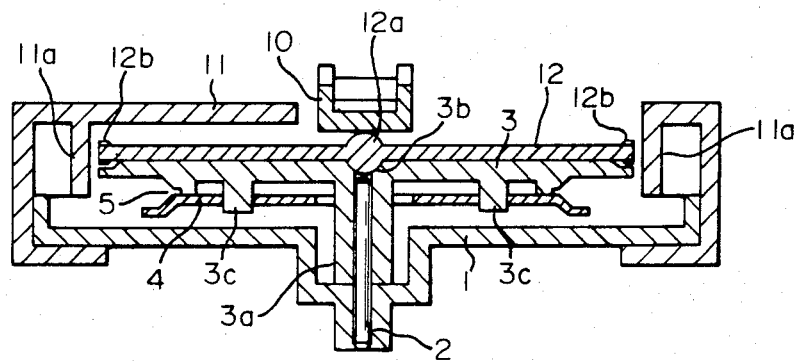
FIG. 2 is a cross-sectional view along line II—II in FIG. 1.
Figure 3:
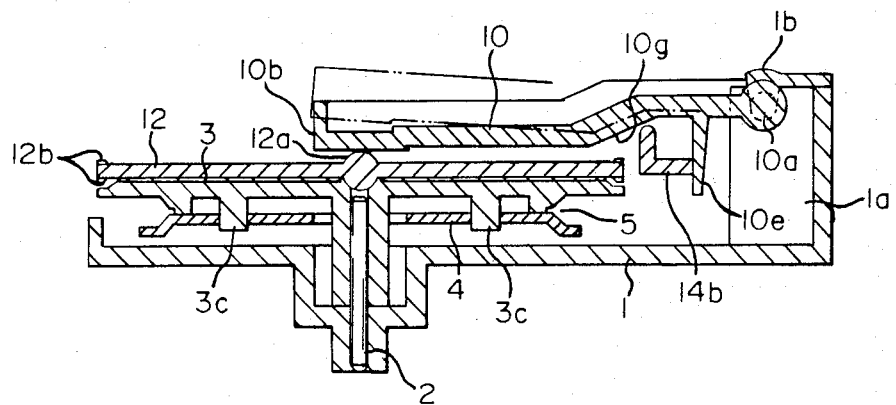
FIG. 3 is a cross-sectional view in the central longitudinal direction in FIG. 1.

In FIGS. 1 to 3, an upright shaft 2 is provided substantially at the central portion on the upper surface of a base 1 and a boss portion 3a of a turntable 3 is rotatably inserted onto the shaft 2. The upper end portion of a center hole of the turntable 3 which is to be inserted onto the shaft 2 is chamfered to form a conical surface 3b. A pin 3c is formed on the lower surface of the turntable 3 and a fly-wheel 4 is fixedly inserted onto the pin 3c. The fly-wheel 4 and the turntable 3 constitute a pulley 5. An electric motor 6 with a pulley 6a is mounted on the base 1 at one of its corners. A reduction idler pulley 7 is attached to the base 1 between the motor 6 and the turntable 3. The motor pulley 6a and the idler pulley 7 are coupled to each other by a belt 8, while the idler pulley 7 and the pulley 5 are coupled to each other by another belt 9. Thus, the rotational force of the motor 6 is transmitted to the turntable 3 through the pulley 6a, the belt 8, the idler pulley 7, and the belt 9 so as to rotate the turntable at a predetermined speed.

Figure 4:
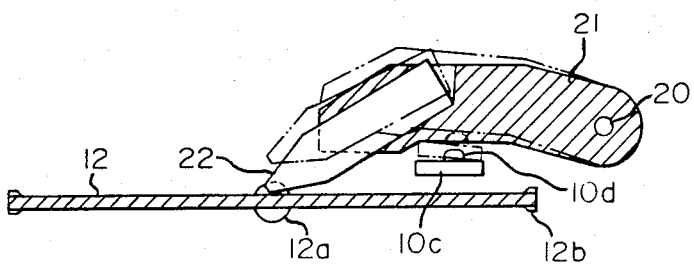
FIG. 4 is a cross-sectional view of a tone arm in the above-mentioned embodiment.
Figure 5:
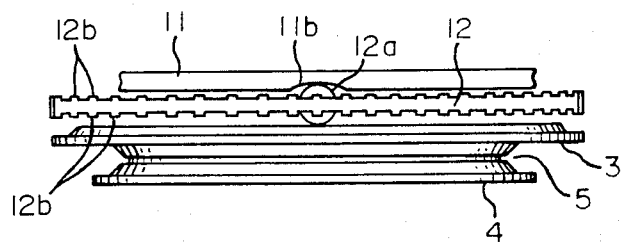
FIG. 5 is a front view of a record insertion opening in the above-mentioned embodiment.

A shaft bearing section 1a is formed at the rear end (upper end in FIG. 1) of the base so as to support a shaft 10a of a record press 10 such that the record press 10 can pivot about the shaft 10a in a plane perpendicular to the upper surface of the base 1. A projection 1b extending from the base 1 elastically contacts the shaft 10a of the record press 10 to prevent the record press from coming off. A free end section 10b of the record press 10 is placed above the shaft 2 which is the axis of revolution of the turntable 3. An arm 10c extends perpendicularly from a side surface of the record press 10. A ridge 10d is formed on the upper surface of the arm 10c in the longitudinal direction thereof as shown in FIG. 4.

Figure 6:
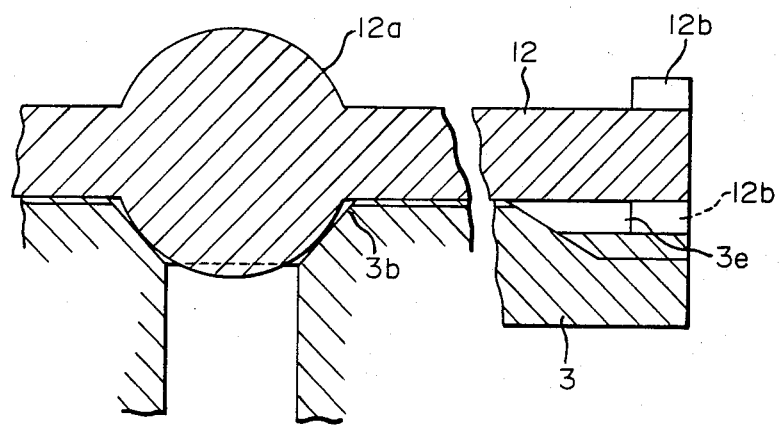
FIG. 6 is a cross-sectional view of a record according to an embodiment of the invention and of record positioning elements in the above-mentioned recording apparatus.
Figure 7:
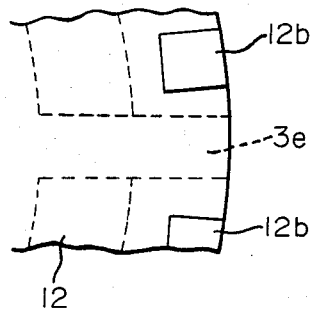
FIG. 7 is a plan view of FIG. 6.

The forward end of the base 1 is overlayed with a record guide 11 such that a tunnel-like space is formed between the guide 11 and the upper surface of the turntable 3. A record 12 is inserted into this tunnel-like space in the direction of the turntable 3 with the recorded plane of the record made parallel to the turntable 3. As shown in FIGS. 6 and 7, the record 12 has a convex protrusion 12a formed at its center on both its upper and lower surfaces. Protrusions 12b are also formed at equal distances along the circumferential edge of both its upper and lower surfaces. There may be any number of protrusions 12b including the case of one protrusion. The record also has a modulated groove section in the intermediate area between the convex protrusion 12a and the circumferential protrusions 12b. Inside the guide 11, guide walls 11a and 11a are formed for guiding the record when it is inserted. A guide groove 11b guides the convex protrusions 12a of the record 12. The convex protrusion 12a of the record 12 falls into the conical hole 3b at the center of the turntable 3 when the record 12 is inserted through the tunnel-like space between the turntable 3 and the guide 11 and is moved to the correct position.

An actuator lever 14 on the side of the record press 10 pivots about a shaft 13 extending from the base 1 in the plane parallel to the inserting direction of the record 12. A two-position selection spring 16 connected between one arm 14a of the actuator lever 14 and a shaft 15 formed on the base 1, so that it is made possible to cause the lever 14 to be selectively brought into either its clockwise rotated position or into its counterclockwise rotated position by causing the lever 14 to rotate beyond the dead point or change point of the spring 16, these positions being clockwise or counterclockwise as indicated in FIG. 1. An arm 14a projects from the side of the base 1 so that the user can swing the lever 14 by pulling the arm 14a or by actuating a not shown lever which engages the lever 14. A protrusion 14c is formed on the arm 14a of the lever 14. The other arm 14b of the lever 14 is positioned in the path of insertion of the record 12 when the lever 14 is brought into its counterclockwise rotated position as shown in FIG. 1 with a double-dotted line. On the other hand, when the arm 14b is put in its clockwise rotated position, it pushes an abutment knob 10e extending downwards from the lower surface of the record press 10 so that the record press 10 is forced by the abutment knob portion 10e to rotate counterclockwise as shown in FIG. 3 and as a result the free end section 10b of the record press 10 presses the convex protrusion 12a of the record 12 into the conical hole 3b of the turntable 3.

A tone arm supporting member 19 swings in a plane parallel with the turntable 3 about a shaft 18 attached to the base 1 in the vicinity of the actuator lever 14. An arm 19a extends outwards from the side of the tone arm supporting member 19, so that when the actuator lever 14 is rotated counterclockwise as shown in FIG. 1, the arm 19a is pushed by the protrusion 14c of the actuator lever 14 and therefore the tone arm supporting member 19 is caused to rotate counterclockwise. As shown in FIG. 4, the tone arm supporting member 19 supports a tone arm 21 rotatable about a horizontal shaft 20 in a plane perpendicular to the plane of the turntable 3. A pickup 22 is rigidly mounted on the tone arm 21. The tone arm 21 is forced by a not shown spring to swing counterclockwise as shown in FIG. 4 to press a stylus of the pickup 22 onto the recorded surface of the record 12 with a predetermined stylus pressure. The tone arm 21 is positioned above the arm 10c of the record press 10 so that when the record press 10 presses the record 12 to the turntable 3, the arm 10c of the record press 10 assumes its lowered position as indicated by a solid line in FIG. 4. The tone arm 21 is forcibly rotated to cause the stylus of the pickup 22 to be in contact with the modulated groove portion of the record 12. On the other hand, under the condition that the record 12 has been removed from the turntable 3, the arm 10c of the record press 10 is lifted to its upper position as indicated by a double-dotted line in FIG. 4 and the tone arm 21 is pushed up by the ridge 10d on the upper surface of the arm 10c so as to cause the pickup 22 to lift off the record 12. An end plate 10f shown in FIG. 1 is attached at the end of the arm 10c so as to limit the counterclockwise swing of the tone arm 21.

A sloping surface 10g is formed at the lower surface of the record press 10 as shown in FIG. 3 so that when the actuator lever 14 is rotated counterclockwise as shown in FIG. 1, the upright edge of the other arm 14b of the actuator lever 14 pushes up the sloping surface 10g so as to cause the record press 10 to swing clockwise as shown in FIG. 3. This swing of the record press 10 causes the tone arm 21 to swing counterclockwise as shown in FIG. 4. Further, the counterclockwise swing shown in FIG. 1 of the actuator lever 14 causes the protrusion 14c to push the arm 19a of the tone arm supporting member 19 to swing the tone arm supporting member 19 and the tone arm 21 counterclockwise. As shown in FIGS. 6 and 7, the turntable 3 is formed with at least one indentation 3e at its circumferential edge such that this indentation 3e may engage the protrusion 12b of the record 12. Further, the apparatus is arranged such that an electric power switch energizes the circuits of the motor 6, etc., when the actuator lever 14 is brought into its clockwise rotated position as indicated by a solid line in FIG. 1.

The operation of the above-mentioned embodiment will now be described. The actuator lever 14 is in its counterclockwise rotated position as indicated by a double-dotted line in FIG. 1 under the condition that the record 12 has not yet been mounted. Accordingly, the arm 14b of the lever 14 pushes the sloping surface 10g of the record press 10 so as to cause the record press to swing upwards with the result that the arm 10c of the record press 10 pushes up the tone arm 21 thereby causing the pickup 22 to come off from the record 12. Another result is that the protrusion 14c of the actuator lever 14 pushes the arm 19a of the tone arm supporting member 19 to bring the tone arm 21 into its counterclockwise rotated position as indicated by a doubledotted line 21A in FIG. 1.

Then the record 12 is inserted into the space between the record guide 11 and the turntable 3. The record 12 is progressively inserted in the direction parallel to the plane of the turntable 3 while the outer periphery of the record 12 is guided by the guide walls 11a and 11a formed at the opposite sides of the guide 11. Also, the convex protrusion 12a of the record 12 is also guided by the guide groove 11b in the guide 11. As the record 12 moves, the arm 14b of the actuator lever 14 is pushed so that the lever 14 swings clockwise as shown in FIG. 1 and the protrusion 14c comes away from the arm 19a of the tone arm supporting member 19. The swing of the lever 14 causes one of the support points of the two-position selection spring 16 to move beyond the change point so that the lever 14 is brought into its clockwise rotated position by the force of the spring 16 as indicated by a solid line in FIG. 1. In the rotational operation of the lever 14, the arm 14b of the lever 14 comes off the sloping surface 10g of the record press 10 as shown in FIG. 3 to allow the record press 10 to swing counterclockwise as shown in FIG. 3. At the same time, the arm 14b of the lever 14 pushes the abutment knob 10e of the record press 10 to urge the record press 10 to swing counterclockwise as shown in FIG. 3. At this time, the convex protrusion 12a at the center of the record 12 is positioned at the center of the turntable 3 and the forward end section 10b of the record press 10, forced to swing in the manner described above, pushes the convex protrusion to cause it to fall into the conical hole 3b of the turntable 3. Thereby the center positioning of the record 12 is accomplished and the record is put in its ready state to be rotated together with the turntable 3.

The swing of the record press 10 by the above-mentioned force causes the arm 10c of the record press 10 to fall downward from the tone arm 21 as indicated by a solid line in FIG. 4. This allows the tone arm 21 to swing under the influence of the spring force to cause the stylus of the pickup 22 to come down onto the modulated groove area of the record 12. Upon the closure of the power source switch and in response to the clockwise swing in FIG. 1 of the actuator lever 14, as described above, the motor 6 begins to rotate the turntable 3 and at the same time an audio amplifying circuit or the like is energized to reproduce an audio signal such as a voice recorded on the record 12. The record 12 is rotated together with the turntable 3 as formed thereon by the pressing force of the record press 10 as well as by the engagement between the protrusion 12b provided at the circumferential edge of the record 12 and the indentation 3e formed at the circumferential edge of the turntable 3. In the playing or reproducing operation, the stylus of the pickup 22 moves along the modulated groove from the outermost track of the record 12 to the innermost one. Hence, the tone arm 21 and the tone arm supporting member 19 swing clockwise as indicated by a solid line shown in FIG. 1.

When the playing operation is stopped and the record 12 is to be removed from the apparatus, the actuator lever 14 is swung counterclockwise in FIG. 1 either by direct manual operation or by the actuation of the release lever. The swing of the lever 14 causes its arm 14b to come off from the abutment knob 10e of the record press 10 and to strike the sloping surface 10g of the record press 10 so as to lift the record press 10 and to thereby release the record 12 from the pressing force holding the same to the turntable 3. At the same time, the ridge 10d of the arm 10c of the record press 10 pushes up the tone arm 21 to cause the pickup 22 to rise off the record 12. Moreover, at this time the power source for the circuit of the motor, etc. has been turned off to de-energize the same. If the lever 14 is further swung, the arm 14b pushes the record 12 towards the record insertion opening. The convex protrusion 12a of the pushed record 12 slides out of the conical hole 3b of the turntable 3. After passing over the change point of the two-position selection spring 16, the swung lever 14 is brought into its counterclockwise rotated position as indicated by a double-dotted line as shown in FIG. 1. Thus, the protrusion 14c pushes the arm 19a of the tone arm supporting member 19 to bring the tone arm 21 into its initial position as indicated by the double-dotted line 21A as shown in FIG. 1. In this state, the record 12 is partly exposed at the record insertion opening so that the record 12 can be taken out or can be reinserted to repeat the playing operation.

According to the present invention, the record 12 is provided with a convex protrusion 12a at its center so that the center positioning of the record 12 can be performed simply by causing the convex protrusion 12a to fall into a center hole formed by a chamfer 3b or other means on the turntable 3, thereby remarkably simplifying the centering mechanism needed in the reproducing apparatus. Further, since the record can be easily inserted into and taken out of the reproducing apparatus while being guided with the convex protrusion 12a fitting along a guiding groove 11b, the guide mechanism can be markedly simplified. Moreover, since protrusions 12b are separately provided at the outer circumferential edge portion of the record, the rotational slip can be prevented by engaging protrusions 12b with corresponding indentations 3e formed on the upper circumferential edge of the turntable 3. The rotational slip preventing mechanism so provided is very simple. Further, the record can be pressed against the turntable only by pressing the convex protrusion 12a at the center of the record, whereby the mechanism for pressing the record can be simplified and frictional force can be reduced.

What is claimed is:

1. A record for play on a turntable having a central concave indentation and one or more circumferentially varying indentations on a circumference of said turntable, comprising:
    a flat disc (12);
    a convex protrusion (12a) substantially at the center of said disc for engaging said central indentation and centering said disc; and
    one or more protrusions (12b) formed on the circumferential periphery of said disc for engaging said circumferentially varying indentations and for rotating said disc as said turntable rotates, said peripheral protrusions varying circumferentially around said disc, insertable into one of said indentations and contactable with a circumferential side of said one indentation.

2. A record, as recited in claim 1, wherein separate circumferential protrusions are formed on both opposing flat sides of said disc.

3. A record, as recited in claim 1, further comprising a recorded portion of said disc between said central convex protrusion and said circumferential protrusions.

* * * * *